(12) United States Patent
Yank, III (10) Patent No.: US 8,983,634 B2
(45) Date of Patent: Mar. 17, 2015

(54) VEHICULAR ENTERTAINMENT STAGE

(76) Inventor: John C. Yank, III, Tuckahoe, NJ (US)

( * ) Notice: Subject to any disclaimer, the term of this patent is extended or adjusted under 35 U.S.C. 154(b) by 416 days.

(21) Appl. No.: 13/365,601

(22) Filed: Feb. 3, 2012

(65) Prior Publication Data

US 2012/0203378 A1    Aug. 9, 2012

Related U.S. Application Data

(60) Provisional application No. 61/439,706, filed on Feb. 4, 2011.

(51) Int. Cl.
| | |
|---|---|
| *G05D 3/00* | (2006.01) |
| *G05D 3/10* | (2006.01) |
| *B60N 2/01* | (2006.01) |
| *B60N 2/02* | (2006.01) |
| *B60N 2/14* | (2006.01) |
| *B60N 2/44* | (2006.01) |
| *B60N 3/06* | (2006.01) |

(52) U.S. Cl.
CPC ............... *B60N 2/01* (2013.01); *B60N 2/0232* (2013.01); *B60N 2/0244* (2013.01); *B60N 2/14* (2013.01); *B60N 2/449* (2013.01); *B60N 3/06* (2013.01); *B60N 2002/024* (2013.01)
USPC ................................ 700/65; 700/275; 701/49

(58) Field of Classification Search
CPC ...... B60N 2/01; B60N 2/0232; B60N 2/0244; B60N 2/14; B60N 2/449; B60N 3/06; B60N 2002/024
USPC ........... 700/275, 9, 17, 19, 20, 65; 701/36, 49
See application file for complete search history.

(56) References Cited

U.S. PATENT DOCUMENTS

| | | | | |
|---|---|---|---|---|
| 5,031,563 | A * | 7/1991 | Matre | 114/188 |
| 6,669,141 | B2 * | 12/2003 | Schmidt-Schaeffer | 244/118.6 |
| 6,991,060 | B2 * | 1/2006 | Chernoff et al. | 180/326 |
| 7,036,883 | B1 * | 5/2006 | Thompson et al. | 297/344.24 |
| 7,040,248 | B1 * | 5/2006 | Whitfield | 114/364 |
| 7,103,460 | B1 * | 9/2006 | Breed | 701/32.9 |
| 7,111,939 | B2 * | 9/2006 | Cok et al. | 353/7 |
| 7,159,683 | B2 * | 1/2007 | Reitter | 180/268 |
| 7,334,839 | B1 * | 2/2008 | Malerba | 297/217.1 |
| 7,490,572 | B2 * | 2/2009 | Grober | 114/191 |
| 7,635,164 | B2 * | 12/2009 | Torres et al. | 297/344.14 |
| 7,712,831 | B2 * | 5/2010 | Abt et al. | 297/257 |
| 7,845,703 | B2 * | 12/2010 | Panzarella et al. | 296/65.11 |
| 7,905,545 | B2 * | 3/2011 | Andersson et al. | 297/217.3 |
| 8,283,801 | B2 * | 10/2012 | Petitpierre | 307/9.1 |
| 8,401,742 | B2 * | 3/2013 | Schliwa et al. | 701/49 |
| 8,423,324 | B2 * | 4/2013 | Boin | 703/1 |
| 2002/0070314 | A1 * | 6/2002 | Schmidt-Schaeffer | 244/118.6 |
| 2003/0141736 | A1 * | 7/2003 | Chernoff et al. | 296/65.01 |
| 2007/0035164 | A1 * | 2/2007 | North | 297/217.1 |

(Continued)

*Primary Examiner* — Charles Kasenge
(74) *Attorney, Agent, or Firm* — Sughrue Mion, PLLC (57) ABSTRACT

Provided herein is a vehicular stage with individual seats and seat control system and method for controlling a movement of a seat, the seat control system including: a motor configured to move the seat in at least one direction; a control computer, which is disposed remotely with respect to the seat, and which is configured to output control commands for controlling the movement of the seat; and a microcontroller, which is connected to the motor and the control computer and configured to receive the control commands from the control computer and to control the motor to move the seat in the at least one direction based on the control commands received from the control computer.

15 Claims, 5 Drawing Sheets

(56) References Cited

U.S. PATENT DOCUMENTS

| | | | |
|---|---|---|---|
| 2007/0164592 A1* | 7/2007 | Gerhardt | 297/344.23 |
| 2008/0009958 A1* | 1/2008 | Abt et al. | 700/29 |
| 2008/0097254 A1* | 4/2008 | Torres et al. | 601/23 |
| 2008/0097256 A1* | 4/2008 | Torres et al. | 601/24 |
| 2008/0185229 A1* | 8/2008 | Panzarella et al. | 187/200 |
| 2008/0242521 A1* | 10/2008 | Einav | 482/110 |
| 2009/0152907 A1* | 6/2009 | Lee | 297/1 |
| 2011/0017869 A1* | 1/2011 | Gonnsen et al. | 244/118.6 |
| 2011/0068599 A1* | 3/2011 | Panzarella et al. | 296/65.11 |

\* cited by examiner

VEHICULAR ENTERTAINMENT STAGE

CROSS-REFERENCE TO RELATED APPLICATION

This application claims priority from U.S. Provisional Application No. 61/439,706, filed on Feb. 4, 2011, in the U.S. Patent and Trademark Office the disclosure of which is incorporated herein by reference in its entirety.

BACKGROUND

Apparatuses and methods consistent with exemplary embodiments relate to a vehicular entertainment stage with controllable seats, and more particularly, to a system and method for centralized control of seating positions and movements to coincide with a vehicular tour, amusement ride, and/or associated presentations.

In the related art, a seat installed in a vehicle is typically controllable in various ways. For example, in a vehicle such as a car, a seat may be raised or lowered, inclined or reclined, moved forward or backward, etc. In other cases, seats may allow for a simple movement or adjustment. For example fishing boats typically have seats which can rotate about an axis so that an angler may effectively fish from different positions easily. On the other hand, in cases where the vehicle has to accommodate a large number of passengers, such as on a ferry boat or a bus, passenger seats may be fixed and entirely immovable.

In each of these cases, the seats are not centrally controllable, i.e., by a remote operator. Instead, if the seats are adjustable to some way, the adjustment must be performed manually, usually by the person sitting in the seat. In certain applications this lack of independent control makes seat adjustment cumbersome. For example, in cases where passengers are participating in a guided activity, such as on a tour bus or an adventure powerboat, a tour guide may wish to direct the passengers' attention to a particular location quickly. In such a situation, the tour guide may desire to coordinate the movement of the passengers' seats. However, this may be difficult to accomplish if the adjusting of the seats is not performed as a coordinated effort. The problem becomes more difficult if there are a large number of seats involved.

SUMMARY

According to an aspect of an exemplary embodiment, there is provided a control system for controlling the movement of a seat, the seat control system including: a motor configured to move the seat in at least one direction; a control computer, which is disposed remotely with respect to the seat, and which is configured to output control commands for controlling the movement of the seat; and a microcontroller, which is connected to the motor and the control computer and configured to receive the control commands from the control computer and to control the motor to move the seat in the at least one direction based on the control commands received from the control computer.

The seat control system may further include a seatbelt sensor connected to the control computer and configured to sense whether a seatbelt of the seat is being used, and the microcontroller is further configured to control the movement of the seat based on whether the seatbelt is being used.

The seat control system may further include a stop button configured to receive a stop command from a user, and if the stop command is received from the user, the stop button is configured to send a stop signal to the microcontroller, and the microcontroller controls the motor to stop.

The movement of the seat may be a rotation about an axis extending through the seat in a vertical direction.

The seat control system may further include a rotation indicator configured to receive a rotation status signal from the microcontroller and provide an indication of a state of rotation of the seat from based on the rotation status signal received from the microcontroller.

The seat control system may further include a speaker configured to receive an audio signal from the microcontroller and output sound based on the audio signal received from the microcontroller.

The seat control system may further include a shaft, which is connected to the seat and driven by the motor, wherein the shaft corresponds to an axis of rotation about which the seat is rotatable.

The seat control system may further include a frame for the seat, wherein the motor and the microcontroller are attached to the frame.

The seat control system may further include a communication cable which connects the control computer to the microcontroller.

According to another aspect of an exemplary embodiment, there is provided a method of controlling a seat from a control computer located remotely from the seat, the method including: receiving a command from the control computer; determining a control signal based on the control command received from the control computer; outputting the control signal to at least one seat control circuit based on the determining of the control signal; and controlling the seat with the at least one seat control circuit based on the output control signal.

The at least one seat control circuit may correspond to a motor for moving the seat.

The moving of the seat may include rotating the seat by a number of degrees based on the output control signal.

The at least one seat control circuit may correspond to a speaker for outputting a sound from the seat.

BRIEF DESCRIPTION OF THE DRAWINGS

The above and/or other aspects will be more apparent by describing in detail exemplary embodiments, with reference to the accompanying drawings, in which.

DETAILED DESCRIPTION OF THE EXEMPLARY EMBODIMENTS

First, the terms used in the present disclosure will be briefly described below before exemplary embodiments of the present inventive concept are described in greater detail.

Most of the terms used herein are general terms that have been widely used in the technical art to which the present inventive concepts pertain. However, some of the terms used herein may be created reflecting intentions of technicians in this art, precedents, or new technologies. Also, some of the terms used herein may be arbitrarily chosen. In this case, these terms are defined in detail below. Accordingly, the specific terms used herein should be understood based on the unique meanings thereof and the whole context of the disclosure as set forth herein.

In the present specification, it should be understood that the terms, such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Also, the terms, such as "portion" "piece," "section," "part," etc., should be understood as a part of a whole; an amount, section or piece. Further, as used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments of the present invention will now be described more fully with reference to the accompanying drawings. The present inventive concept may, however, be embodied in many different forms and should not be construed as being limited to the exemplary embodiments set forth herein. Rather, these exemplary embodiments are provided so that this disclosure will be thorough and complete and will fully convey the concept of the invention to those of ordinary skill in the art. In the following description, well-known functions or constructions are not described in detail if it is determined that as they would obscure the disclosure due to explanation of the exemplary embodiments in unnecessary detail. The same reference numerals represent the same elements throughout the drawings.

The term "seat" as used herein refers to an object in or on which a person may sit, such as a stool, chair, bench, etc. Moreover, the term "seat" may include both a seat cushion as well as a frame in which a seat cushion is placed. Furthermore, "seat" may used in both the singular and the plural sense, depending on the context of the particular description herein.

Figure 1:
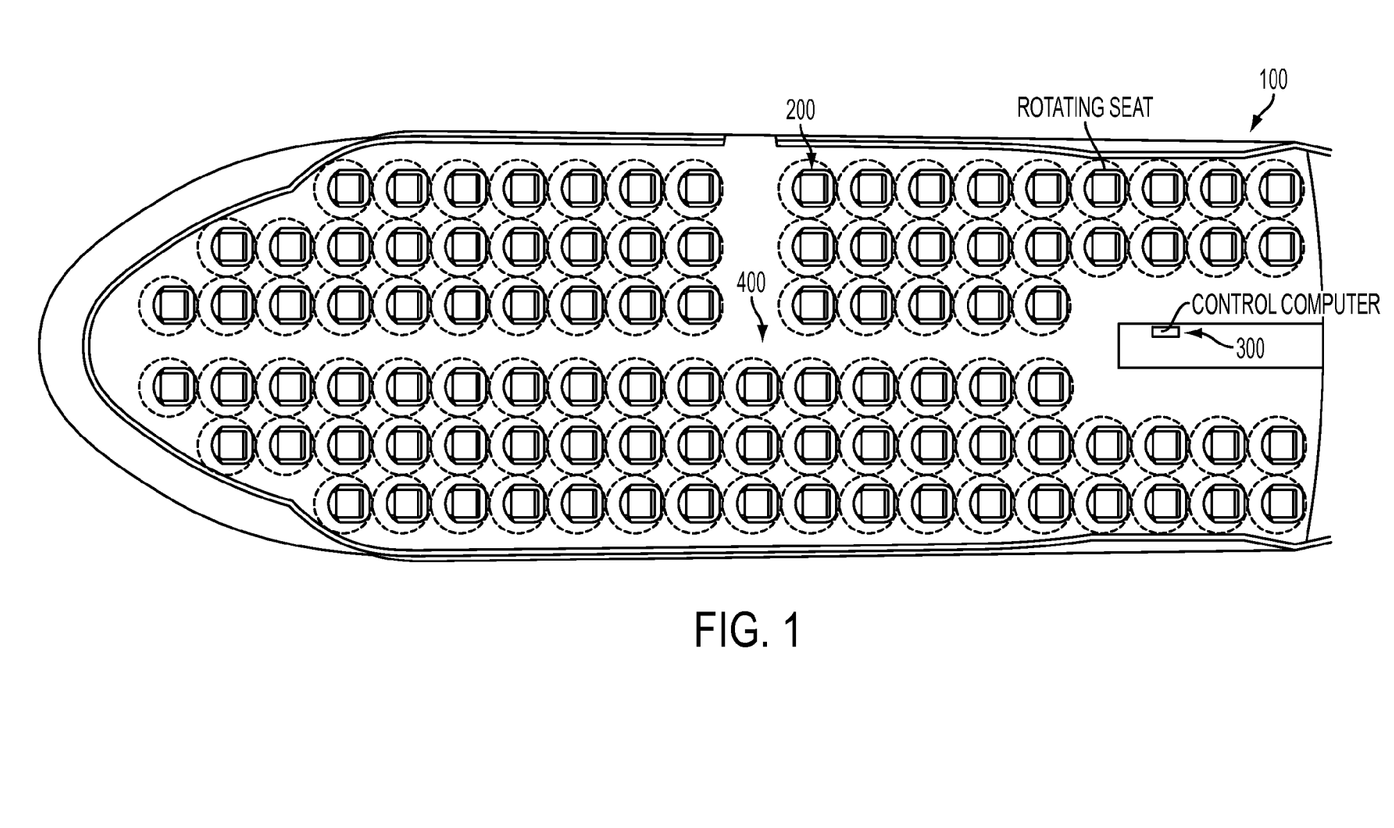
FIG. 1 illustrates an example of a group of independently controllable seats according to an exemplary embodiment.

As shown in FIG. 1, an exemplary embodiment of the present invention includes a plurality of seats 200 installed in a boat 100. The seats are independently controllable by an operator of the control computer 300. The system may be configured to allow the operator to control each seat individually, or alternatively, according to groups of seats, which may include some or even all of the seats.

Commands may be entered by an operator at the control computer 300 in a variety of ways. For example, the control computer 300 may include buttons (not shown) which the operator may press to perform a desired command. Likewise, the control computer 300 may include a touch panel (not shown) which allows the operator to enter the commands. Of course, other input units are possible (e.g., mouse and keyboard, remote control, voice activation, etc.).

For example, the operator may be a tour guide on an adventure boat. During a guided tour, the operator may want to direct the passengers' attention to an item of interest in some particular direction. Instead of asking all of the passengers to turn their seats 200 individually, the operator may use the control computer 300 to independently turn the passengers' seats for them so as to face the direction of the item of interest.

Similarly, since each seat 200 may be individually controlled via the control computer 300, the operator may wish to turn some seats in one direction while turning other seats in another direction. For example, if the tour guide is located at a center position 400, each of the seats 200 may be individually controlled so as to turn toward her. Further, the tour guide may move from bow to stern, for example, and each of the chairs 200 could be controlled to track her movements around the boat.

Different seating movements and configurations can be preprogrammed into the control computer as modes such as "face center," "face left," "spin clockwise 360 degrees" or whatever is movements or positions are desired to accomplish the desired effect. Preprogramming modes allows the operator to quickly move groups of seats to accompany the desires of the tour guide or create an amusement effect in a boat or vehicular ride.

While the exemplary embodiment shown in FIG. 1 illustrates a control computer 300 located near the stern, the present invention is not necessarily limited thereto. The control computer 300 may be located at any location, provided the control computer 300 maintains a communication link with the microcontroller of the seat (as described hereinbelow). The term "microcontroller" is used herein in a general sense, and may include a general purpose computer, controller, processor, microprocessor, Advanced RISC Machine (ARM), application-specific integrated circuit (ASIC), system-on-chip (SoC), etc.

Figure 2:
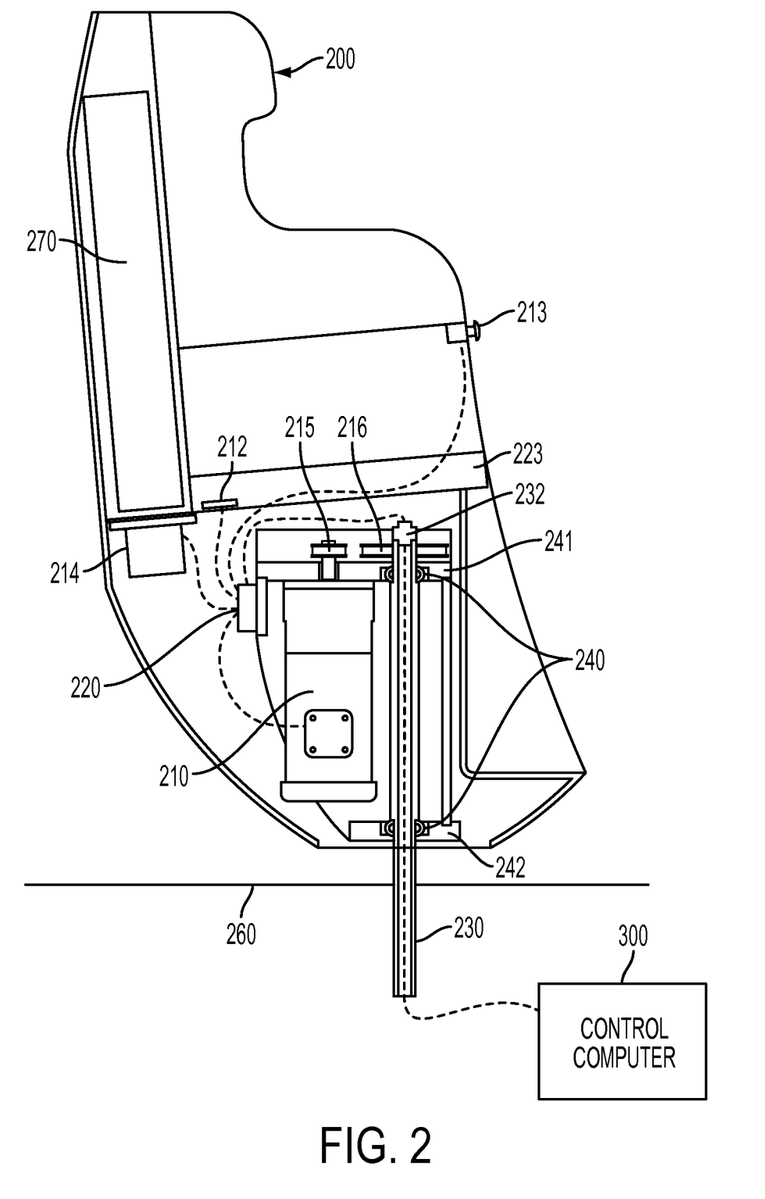
FIG. 2 illustrates a side view perspective of an independently controllable seat according to an exemplary embodiment.

FIG. 2 shows a cross-sectional view of a seat according to an exemplary embodiment of the present invention. The seat 200 in FIG. includes the seat frame 201 and the seat cushion 223. A motor 210 is installed in the seat frame 201 underneath the seat cushion 223. The Baldor® Gearmotor GMP3340 is an example of a motor which may be used. The motor 210 is connected to a driving pulley 215. The Maska® P14L050-PB pulley is an example of a driving pulley which may be used. The driving pulley 215 drives the driven pulley 216 via a timing belt 234 (shown in FIG. 4). The driven pulley 216 is mounted on top of a hollow shaft 230, and connected to the bottom of the seat frame 201 just below the seat cushion 223. The Maska® P40L050 2012 pulley is an example of a driven pulley which may be used. The shaft 230 runs vertically downward from a first portion 241 of the seat frame 201 underneath the driven pulley 216 down through a second portion 242 of the seat frame 201. The bottom end of the shaft 230 is fixed at a point in the deck 260 below the second portion 242 of the seat frame 201, such that when the motor 210 turns, the driving pulley 215 drives the driven pulley 216. The rotation of the driven pulley 216 causes the seat 200 to rotate about an axis of the hollow shaft 230. The shaft 230 remains fixed which the seat 200 moves around it. Bearings 240 are installed at the first and second portions of the seat frame 201, respectively, to facilitate movement of the seat 200 around the shaft. Timkin® bearings are an example of a type of bearing which may be used. The above-described setup permits the seat 200 to be rotated by the operation of the motor 210.

Since the shaft 230 is hollow, it is possible to run a communication cable 301 from the microcontroller 220 to the remotely located control computer 300. The cable 301 can be any cable 301 suitable for sending signals, such as Category 5, Category 5e, etc. The cable 301 exits the top portion of the shaft and connects to the microcontroller 220. A slip ring 232 may be installed at the top portion of the shaft 230 to prevent the cable 301 from twisting as the seat 200 rotates about the shaft 230. The Mercotac® model 830 is an example of a slip ring that may be used.

It should be noted that although the seat frame 201, as described above, includes a first portion 241 and a second portion 242 through which the hollow shaft extends, the present invention is not limited thereto. That is, the first portion 241 and the second portion 242 may be part of the actual seat frame 201, or alternatively, the first portion 241 and the second portion 242 may be part of a separate sub-frame which is attached to the seat frame 201.

Figure 3:
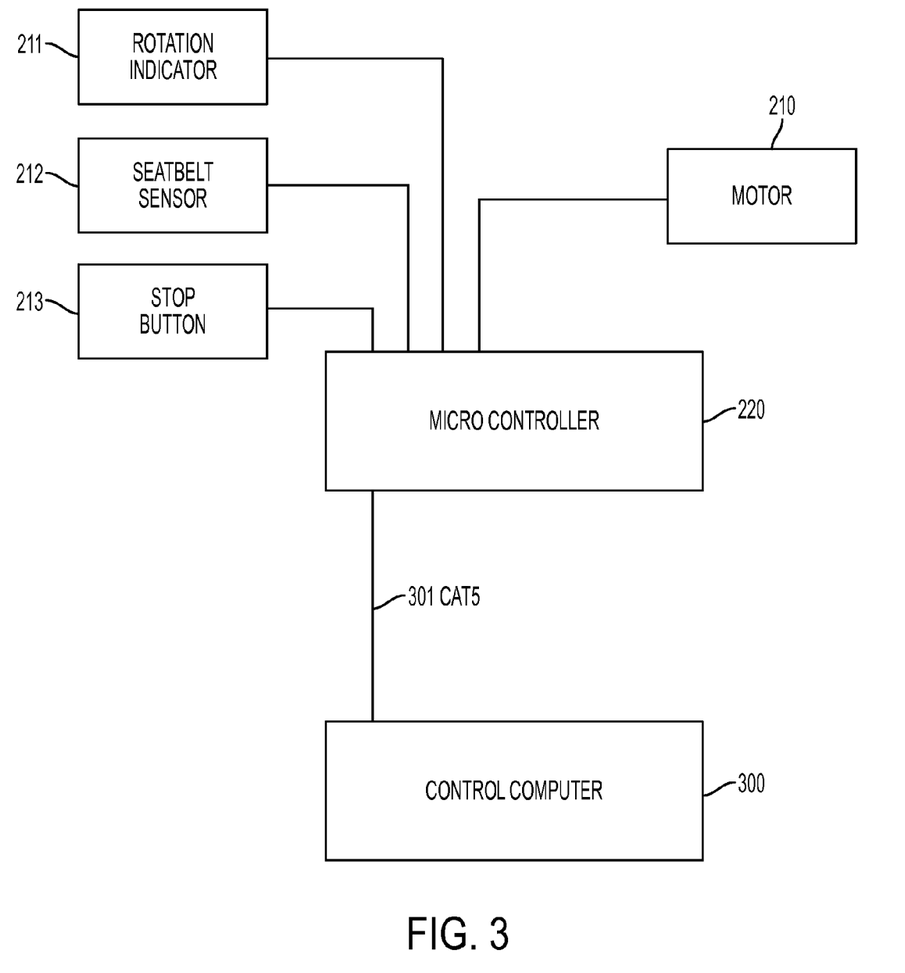
FIG. 3 illustrates a block diagram of a system for controlling a seat according to an exemplary embodiment.

FIG. 3 illustrates a block diagram of the circuitry involved in connecting all of the electronic components of the seat 200 and the control computer 300. The motor 210 is connected to the microcontroller 220. The microcontroller 220 is capable of receiving an input command from the control computer 300 via the cable 301, and then sending the corresponding command signal to activate the motor 210. As noted above, once the motor 210 starts turning, the seat 200 will start turning due to the above-described connection between the motor 210, the pulleys 215 and 216, etc., and the seat 200.

As shown in FIG. 3, the seat 200 may include various operational circuits for performing different tasks. For example, the seat 200 may include a rotation indicator 211 which may indicate information about the rotation, such as the degree of rotation, whether rotation is currently happening, etc. A seatbelt sensor 212 may be installed and connected to the seatbelt 225 (shown in FIG. 5) to detect whether the seatbelt 225 is currently in use. A stop button 213 may be installed so that the passenger sitting in the seat 200 may manually override and deactivate the rotation of the seat 200 by shutting off power to the motor 210.

Each of the operational circuits is then connected to the microcontroller 220, and thereby each circuit may send and/or receive signals from the microcontroller 220. For example, if the seat 200 is currently rotating due to the turning of the motor 210, the microcontroller 220 can then send a signal to the rotation indicator 211 which causes the rotation indicator 211 to activate and indicate that rotation is occurring (e.g., by lighting a light mounted on the seat 200). In this case, the operational circuit for the rotation indicator 211 receives a signal from the microcontroller 220.

As noted above, the rotation indicator 211 may also function as a rotational sensor which senses the degree of rotation to which the seat has rotated. The rotation indicator 211 may send the rotation information back to the microcontroller 220, and the microcontroller may then control the seat accordingly. For example, if the operator enters a command to rotate a seat 200 by 180 degrees, the command is sent to the microcontroller 220 of the seat 200 via the cable 301. The microcontroller then activates the motor 210 to begin rotating the seat 200. The rotation indicator 211 feeds back a signal to the microcontroller 220 indicating the current degree of rotation. Once the degree of rotation reaches the target amount (e.g., 180 degrees), the microcontroller 220 then controls the motor 210 to shut off, and thus stops the rotation of the seat 200. In this way, the use of the rotation indicator 211 may help the controlling of the seat 200 be performed with a higher degree of precision.

The microcontroller 220 may also receive signals from the respective operational circuits. For example, as noted above, the seatbelt sensor 212 detects whether the passenger's seatbelt 225 is connected. If the seatbelt sensor 212 determines that the passenger's seatbelt 225 is not connected, the seatbelt sensor 212 may send a command signal to the microcontroller 220 to deactivate the operation of the motor 210. Similarly, the stop button 213, if pressed, can be made to send a signal to the microcontroller 220 to shut down the operation of the motor 210. Other safety features may be implemented in a similar manner.

An operator may enter a command at the control computer 300 to perform some action at a particular seat, or with respect to a group of seats, from among the seats 200. For example, the operator may enter a command to rotate all of the seats 200 in a specific direction. The control computer 300 then sends a command signal to the microcontroller 220 via the communication cable 301 to activate the operation of the motor 210. The microcontroller 200 then sends an ON signal to each motor (i.e., within each seat). Each of the motors then turn on and rotate the respective seats.

The operator may also control the degree to which the seat (or seats) is made to rotate. For example, if the operator desires to turn a group of seats by 90 degrees, the operator may enter the command into the control computer 300 to rotate seats X through Y by 90 degrees. The control computer 300 then sends a command signal to the microcontroller 220 via the communication cable 301 to activate the operation of the motor 210 for each seat X through Y, and then stop after 90 degrees of rotation. Accordingly, each microcontroller 220 (i.e., embedded in each seat X through Y) sends an ON signal the respective motor 210. After 90 degrees of rotation, each microcontroller 220 then sends an OFF signal to each respective motor 210.

It should be noted that the control computer 300 could be configured to send a single signal to each microcontroller 220, whereby the single signal could include both the start and stop commands. Alternatively, the control computer 300 could be configured to send a first signal to each microcontroller 220 to turn on the respective motors 210, and then send a second signal to each microcontroller 220 to turn off the respective motors 210 after the seats 200 have rotated by the desired amount.

Since each seat 200 includes a motor 210 and a microcontroller 220, the control computer 300 should be able to communicate with each microcontroller 220 in order to control each respective motor 210. Therefore, the control computer 300 can be wired via a communication cable to a multi-port Ethernet hub (not shown), for example, and the hub can then be wired via a communication cable 301 to each respective microcontroller 220.

Figure 4:
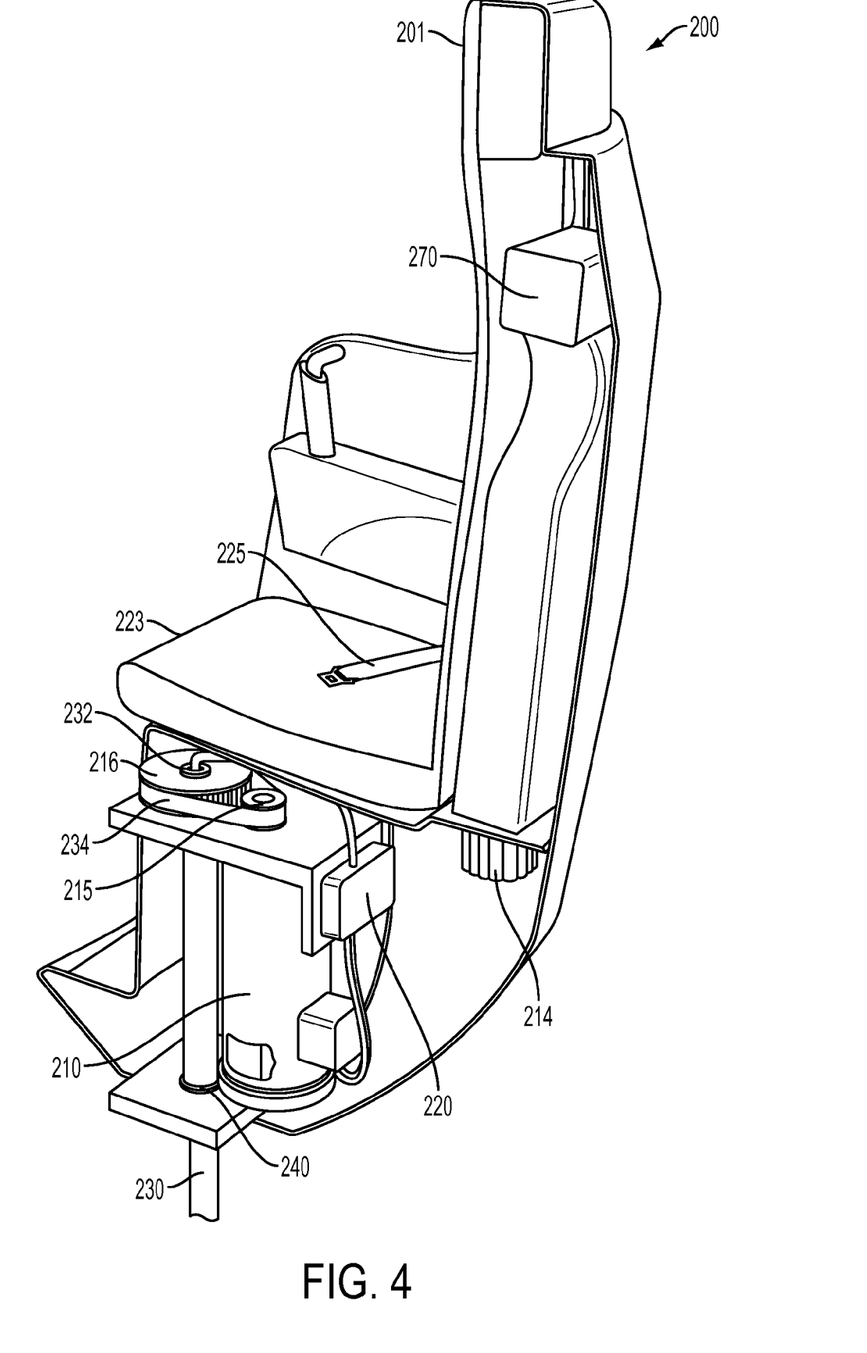
FIG. 4 illustrates a cutaway view of a seat according to an exemplary embodiment.
Figure 5:
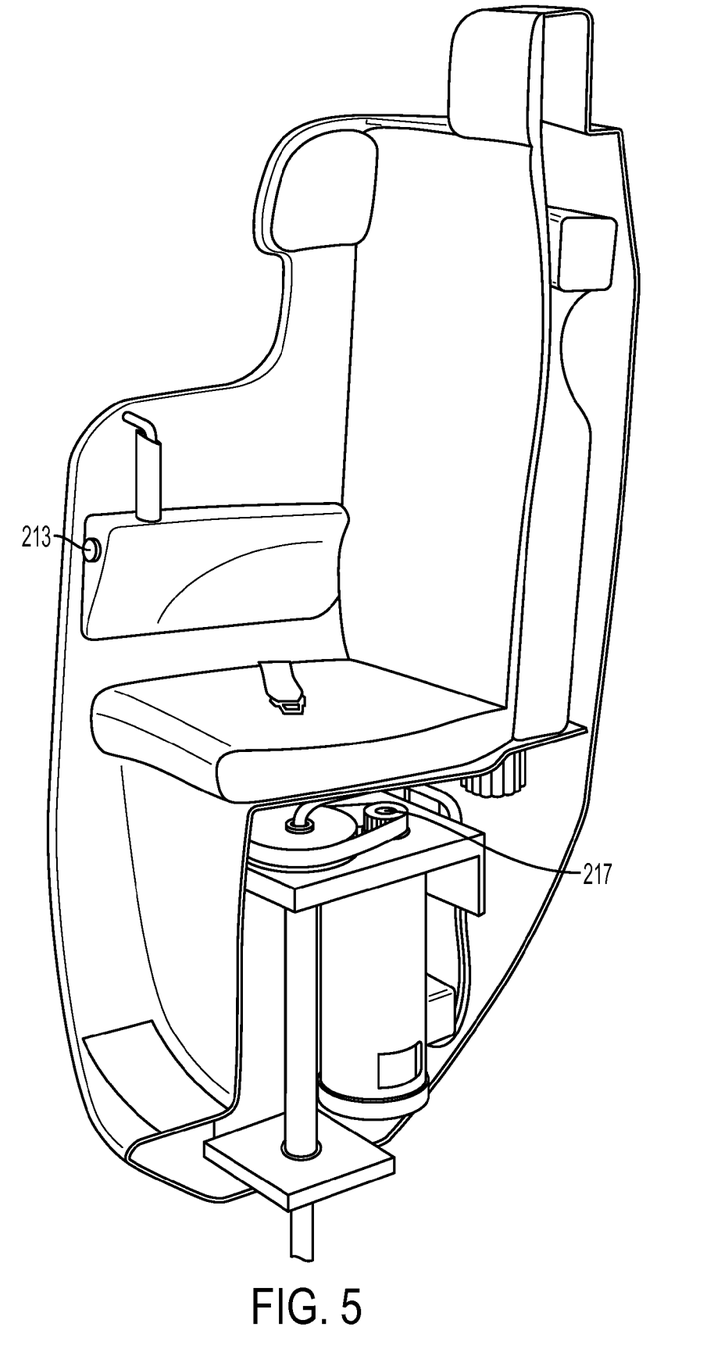
FIG. 5 illustrates another cutaway view of a seat according to an exemplary embodiment.

FIGS. 4 and 5 show different cutaway perspective views of a seat 200 according to an exemplary embodiment. As shown in FIG. 4, each seat may also be equipped with a speaker 214 which may be connected to the microcontroller 220, and thereby controllable from the control computer 300. The ButtKicker® mini LFE subwoofer is an example of a speaker which may be used. The operator may then wish to output sound signals from the control computer 300 intended for a particular seat or group of seats from among the seats 200. For example, the operator may enter a command at the control computer 300 to send a particular sound (e.g., a sound effect, or an amplified signal of the operator's voice, etc.) to a specific seat. The command signal is then sent to the microcontroller 220 for that seat 200 via the communication cable 301. The microcontroller 220 for that seat 200 then outputs the appropriate audio signal to the speaker 214.

In the case of a boat seat, each seat may also be equipped with a life jacket 270 located within the seat frame 201, which is accessible through a breakaway panel in the seat back. Of course, the life jacket may be located somewhere else, such as the seat cushion. It is possible to have the deployment of the life jackets be made manually from the seat 200, or from the control computer 300, by the above-described exemplary embodiments. Other safety features controllable both locally and remotely are also possible under other exemplary embodiments of the present invention.

FIG. 4 also shows the belt 234 which connects the driving pulley 215 and the driven pulley 216. The respective sizes of the driving pulley 215 and the driven pulley 216 can be configured so as to turn the seat at a rate which is comfortable and safe for the passenger. That is, the optimal pulley sizes and the pulley to belt ratio may be determined so as to ensure that the resulting turning motion of the seat 200 is appropriate for a passenger. These particulars may be predetermined based on known formulas and target values, and/or determined through trial and error.

FIG. 5 shows another cutaway perspective view of a seat 200 according to an exemplary embodiment. As shown in FIG. 5, the seat 200 may also include an angle of rotation indicator 217. The angle of rotation indicator 217 may simply be a mark on the top face of the driving pulley 215, which indicates an angle between 0 and 360.

Other exemplary embodiments may provide for implementing various other kinds of pre-programmed controlling actions of the seats 200 from the control computer 300. For example, the operator may wish to make all of the seats rotate in unison with or in response to the movement of the boat (or other vehicle). One exemplary mode is a "counter spin mode." Prior art adventure boats made by the instant inventor are capable of being driven into a power spin, such that the boat turns so sharply in one direction that it spins on top of the water approximately 180 degrees. A counter spin mode includes having the audience seats rotate a similar amount in the opposite direction of the boat rotation during this spin, and at a similar speed of rotation. The net effect of the counter spin mode is that the audience will essentially face forward with the same field of view, while the boat appears to spin under the audience members. Of course, different effects can be created by altering the amount and speed of rotation of the boat, seats, or both.

The system may include motion detection sensors (not shown) as electronic circuits connected to microcontrollers 220, or at the control computer 300. The system may include a pre-programmed mode whereby if the rotation detection sensor detects motion, such as rotation in a particular direction, the system may automatically operate to force the motor 210 of each seat 200 to cause the respective seat to move with or counter to the motion of the surrounding vehicle/watercraft.

As noted above, the seat may include a stop button 213. FIG. 5 shows an example of how the stop button 213 may be mounted into an armrest of the seat 200. The present invention may also include locating the stop button 213 at a different location. Furthermore, it should be noted that different types of buttons/switches are also possible according to other exemplary embodiments. For example, the seat may be equipped with a communication button to communicate with the operator or someone else, or a voting button to respond to questions from the operator, or others.

The foregoing exemplary embodiments are merely exemplary and are not to be construed as limiting the present inventive concept. The exemplary embodiments can be readily applied to other types of apparatuses and situations. For example, some of the foregoing exemplary embodiments describe a seat controlling system in the context of a vehicle application, such as in a tour bus or an adventure boat. However, the present invention is not limited there, and could be equally applicable to non-vehicular applications, such as theater, a planetarium, stadium seating, etc. Moreover, although some of the above examples are disclosed in relation to a boat, these concepts could be employed on a bus or many other types of vehicles.

Additionally, it should be noted that while some of the foregoing exemplary embodiments describe a seat controlling system for controlling rotation of a seat or plurality of seats, the present invention is not limited thereto. Other movements and adjustments might be made, such as reclining or inclining, raising or lowering, etc.

The description of the exemplary embodiments is intended to be illustrative, and not to limit the scope of the claims, and many alternatives, modifications, and variations will be apparent to those skilled in the art.

What is claimed is:

1. A seat control system in a boat, the seat control system comprising:
   a plurality of seats disposed on said boat;
   a central control computer, which is disposed remotely with respect to said seats, and which includes a program that causes said central control computer to output control commands for controlling the movement of said seats while the boat is moving, wherein said control commands include commands to rotate the seats in a direction counter to a turning direction of said boat;
   said plurality of seats each including:
   a motor configured to move the corresponding seat in at least one direction;
   a microcontroller, which is connected to the motor and the central control computer and configured to receive the control commands from the central control computer and to control the motor to move the corresponding seat while the boat is moving in the at least one direction based on the control commands received from the central control computer.

2. The seat control system of claim 1, further comprising a seatbelt sensor disposed at each seat and configured to sense whether a seatbelt of the corresponding seat is being used, and
   the microcontroller is further configured to control the movement of the seat based on whether the seatbelt is being used.

3. The seat control system of claim 1, further comprising a stop button located at each seat and configured to receive a stop command from a user, and
   if the stop command is received from the user, the stop button is configured to send a stop signal to the microcontroller, and the microcontroller controls the motor to stop.

4. The seat control system of claim 1, wherein the movement is a rotation about an axis extending through the seat in a vertical direction.

5. The seat control system of claim 4, wherein each seat further comprises a rotation indicator configured to receive a rotation status signal from the microcontroller and provide an indication of a state of rotation of the seat based on the rotation status signal received from the microcontroller.

6. The seat control system of claim 1, further comprising a speaker configured to receive an audio signal from the microcontroller and output sound based on the audio signal received from the microcontroller.

7. The seat control system of claim 1, wherein each seat further comprises a shaft, which is connected to the seat and driven by the motor, wherein the shaft corresponds to an axis of rotation about which the seat is rotatable.

8. The seat control system of claim 1, wherein each seat further comprises a frame for the seat, wherein the motor and the microcontroller are attached to the frame.

9. The seat control system of claim 1, further comprising a communication cable which connects the control computer to the microcontrollers.

10. The seat control system according to claim 1, wherein said boat is operable to spin on the water, and said control commands include commands to rotate the seats in a direction counter to the spinning direction of the boat so that said seats maintain substantially the same relative direction with respect to landmarks outside of the boat.

11. A method of controlling a plurality of seats from a central control computer located remotely from said seats in a boat, the method comprising:

sending a command from the central control computer to each of said seats, said central control computer including a program that causes said central control computer to output said commands, wherein said command includes at least one command to rotate the seat in a direction counter to a turning direction of said boat; and at each of said seats:

receiving said command;

determining a control signal based on the control command received from the control computer;

outputting the control signal to at least one seat control circuit based on the determining of the control signal, while the boat is moving; and controlling the seat with the at least one seat control circuit based on the output control fsignal, while said boat is moving.

12. The method of claim 11, wherein the at least one seat control circuit corresponds to a motor for moving the seat.

13. The method of claim 12, wherein the moving of the seat comprises rotating the seat by a number of degrees based on the output control signal.

14. The method of claim 11, wherein the at least one seat control circuit corresponds to a speaker for outputting a sound from the seat.

15. The method according to claim 11, wherein said boat is operable to spin on the water, and said command includes at least one command to rotate the seat in a direction counter to the spinning direction of the boat so that said seat maintains substantially the same relative direction with respect to landmarks outside of the boat.

* * * * *